United States Patent [19]

Morse et al.

[11] Patent Number: 4,956,908
[45] Date of Patent: Sep. 18, 1990

[54] METHOD FOR MAKING A LIGHT-TIGHT CASSETTE

[75] Inventors: Mark J. Morse; Andrew E. Dominesey, both of Rochester, N.Y.

[73] Assignee: Eastman Kodak Company, Rochester, N.Y.

[21] Appl. No.: 359,073

[22] Filed: May 26, 1989

[51] Int. Cl.$^5$ .............................................. B23P 11/00
[52] U.S. Cl. ..................................... 29/438; 206/409; 242/71.1; 354/275; 29/453
[58] Field of Search ................. 29/428, 434, 438, 440, 29/453; 242/71, 71.1, 71.2; 354/275; 206/408, 409

[56] References Cited

U.S. PATENT DOCUMENTS

| | | | |
|---|---|---|---|
| 1,871,217 | 8/1932 | Klaus | 354/277 |
| 3,787,513 | 11/1988 | Auble et al. | 354/275 X |
| 4,034,929 | 7/1977 | Ebner, Jr. | 242/71.1 |
| 4,068,247 | 1/1978 | Bouwen et al. | 354/275 |
| 4,221,479 | 9/1980 | Harvey | 242/71.1 X |
| 4,239,164 | 12/1980 | Barnsbee et al. | 206/409 X |
| 4,272,035 | 6/1981 | Sherman et al. | 242/71.1 |
| 4,783,672 | 11/1988 | Wirtz et al. | 354/275 X |
| 4,821,876 | 4/1989 | Naito et al. | 242/71.1 |
| 4,842,211 | 6/1989 | Robbins | 206/409 |
| 4,854,519 | 8/1989 | Maeda et al. | 354/275 X |

OTHER PUBLICATIONS

*Research Disclosure*, Oct. 1976, pp. 26–27, Article No. 15033, "Web Dispensing Cassette", by W. P. Boyd and M. J. Morse.

*Primary Examiner*—Timothy V. Eley
*Assistant Examiner*—Frances Chin
*Attorney, Agent, or Firm*—William C. Dixon, III

[57] ABSTRACT

A light-tight cassette, and method of making same, for enclosing and dispensing a roll of photosensitive web material. The cassette comprises a folded fiberboard housing having a plurality of housing wall portions with oppositely projecting lateral edges which define opposite sides of the housing. The plurality includes two planar wall portions that extend perpendicularly to each other to respective ends thereof which are disposed in spaced alignment to provide an opening between them. Two extruded plastic light-locking members are attached to those wall portion ends, respectively, one such member extending across the opening toward the other member to form a web exit passageway therebetween. The one member includes a resiliently flexible, inwardly projecting cantilever portion that is biased toward an opposing portion of the other member, both such portions having light-locking material thereon. A pair of molded plastic side caps are attached to the opposite sides of the housing, respectively, each cap having an inward-facing hub adapted to support a bearing core on which the roll of web material is freely rotatable to dispense such material through the web exit passageway.

18 Claims, 8 Drawing Sheets

METHOD FOR MAKING A LIGHT-TIGHT CASSETTE

BACKGROUND OF THE INVENTION

1. Field of the invention

The present invention relates to light-tight cassettes, particularly those intended for housing and dispensing a roll of photosensitive web material, and more particularly to an improved method for making such cassettes.

2. Description of the Prior Art

Light-tight cassettes adapted to house and dispense photosensitive web material, such as phototypesetting paper or film, are well known in the prior art. Examples may be found in the following documents:

U.S. Pat. No. 4,034,929—Discloses a photosensitive roll dispensing cassette having an exit slot formed by parallel flanges bent inwardly from adjacent cassette walls, and rendered light-tight by plush-covered, U-shaped, rigid metal strips removably inserted over those flanges.

U.S. Pat. No. 4,068,247—Discloses a photosensitive roll dispensing cassette having an exit slot formed by integral extensions of adjacent cassette walls that project inwardly therefrom in generally parallel relation to each other, with plush material thereon facing the exit path.

Research Disclosure, Oct. 1976, pages 26–27, Article 15033—Discloses a photosensitive roll dispensing cassette having an exit slot provided by a pair of faceted tubes formed from integral extensions of adjacent cassette walls folded back upon themselves and bearing resilient light-locking material.

While such cassettes may have sufficed for their own particular purposes, there has nonetheless remained a need for an improved cassette of this type that offers enhanced light-lock integrity, exit-path consistency, and exit-pull-force uniformity, and which is simpler and less costly to make. Concomitantly, there has remained a need for an improved method of making such a cassette that possesses those attributes.

An overall objective of this invention, therefore, has been to provide an improved method for making a light-tight cassette that meets the foregoing needs.

SUMMARY OF THE INVENTION

The present invention finds utility in an improved method of making a light-tight cassette for enclosing and dispensing a roll of web material. The improved method comprises these steps:

Providing a fiberboard sheet of predetermined dimensions;

Folding that sheet to form a housing having a plurality of housing wall portions with oppositely projecting lateral edges defining first and second open sides of the housing, said plurality including first and second substantially planar wall portions that extend substantially perpendicularly to each other to respective first and second ends thereof which are disposed in spaced alignment to define an opening therebetween;

Providing first and second extruded plastic light-locking members having means for respective attachment thereof to the first and second ends of the first and second wall portions;

Attaching the first and second light-locking members to the first and second wall portion ends, respectively, so that the first member extends across said opening toward the second member to define a web exit passageway therebetween, the first member including an inwardly projecting cantilever portion resiliently biased toward an opposing portion of the second member, at least one of the cantilever and opposing portions having light-locking material thereon for light-locking the exit passageway;

Providing the roll of web material wound upon a hollow roll forming core having first and second opposite ends substantially flush with respective lateral edges of the web material wound thereon, the roll forming core ends defining an overall roll width therebetween;

Providing a roll bearing core configured to fit slidably within the hollow roll forming core, the roll bearing core having first and second oppositely projecting end portions that define a bearing core length greater than the overall roll width;

Providing first and second molded plastic side caps having means for respective attachment thereof to the first and second open housing sides and means for receiving, respectively, the first and second end portions of the roll bearing core;

Attaching the first side cap to the first open housing side so that the first housing side is thereby closed;

Inserting the roll bearing core through the second open housing side and fully into the housing so that the first bearing core end portion is received by the receiving means on the first side cap;

Inserting the roll of web material through the second open housing side, around the roll bearing core, and slidably along the bearing core into the housing so that both of the bearing core end portions extend beyond the roll forming core ends, respectively, and so that an end portion of the web material leading from the roll projects outwardly through the passageway; and Attaching the second side cap to the second open housing side so that the second bearing core end portion is received by the receiving means on the second side cap, and so that the second housing side is thereby closed.

In the disclosed embodiments of the improved method of this invention, the step of providing the first and second light-locking members includes extruding each of those members so that its means for attachment comprises a resiliently flexible U-shaped portion with open and closed ends defining a channel configured to slidably receive and resiliently grip one of the wall portion ends, and further includes extruding the first such member so that it has a substantially planar intermediate portion extending substantially perpendicularly from its U-shaped portion closed end to its cantilever portion, and so that the cantilever portion is flexibly joined to the intermediate portion to project therefrom in a resiliently flexible manner.

This invention, and its objects and advantages, will become more apparent in the detailed description of the embodiments thereof presented hereinbelow.

BRIEF DESCRIPTION OF THE DRAWINGS

In the detailed description of the embodiments of this invention presented below, reference is made to the accompanying drawings, wherein like reference characters denote like elements, and wherein.

DESCRIPTION OF THE ILLUSTRATED EMBODIMENTS

Because certain parts of, and practices relating to, light-tight cassettes are well known, the following description is directed in particular to those elements and steps forming or cooperating directly with this invention. Elements and steps not specifically shown or described herein are selectable from those known in the relevant art.

Figure 1:
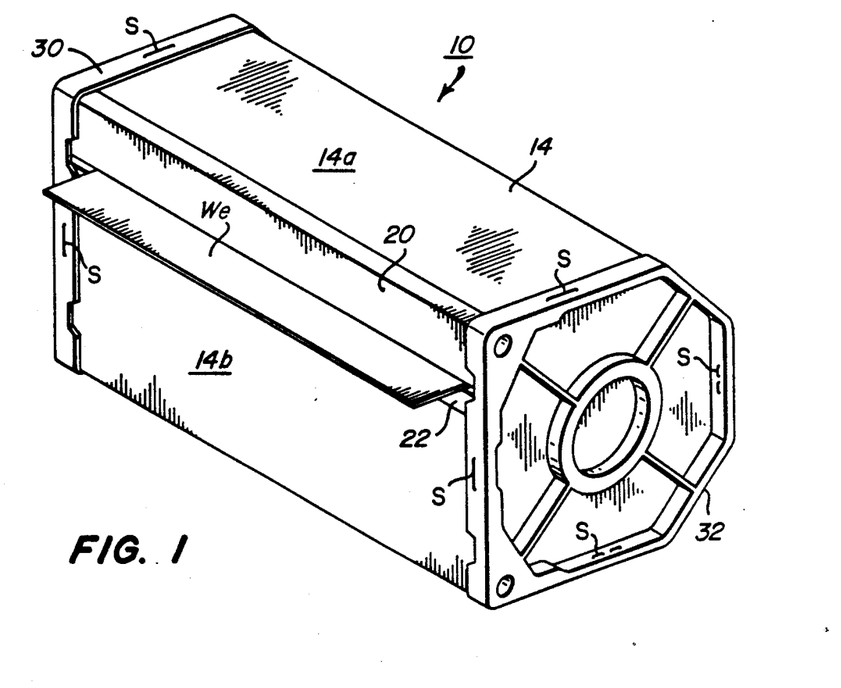
FIG. 1 is a perspective view of a light-tight cassette as made in accordance with the improved method of this invention, showing the cassette in its fully assembled and closed condition.
Figure 2:
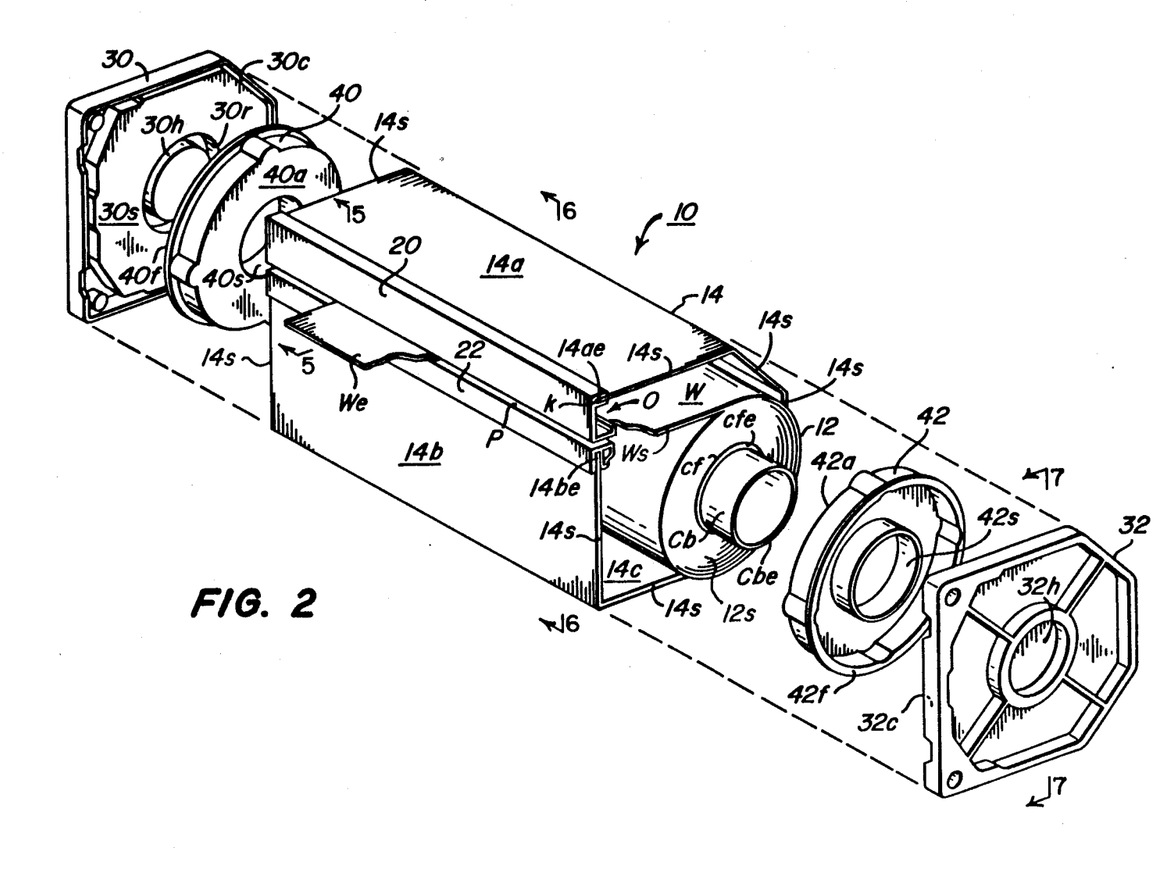
FIG. 2 is an exploded perspective view of the cassette shown in FIG. 1, with its side caps separated from the cassette housing and the web roll therein partially withdrawn.
Figure 8:
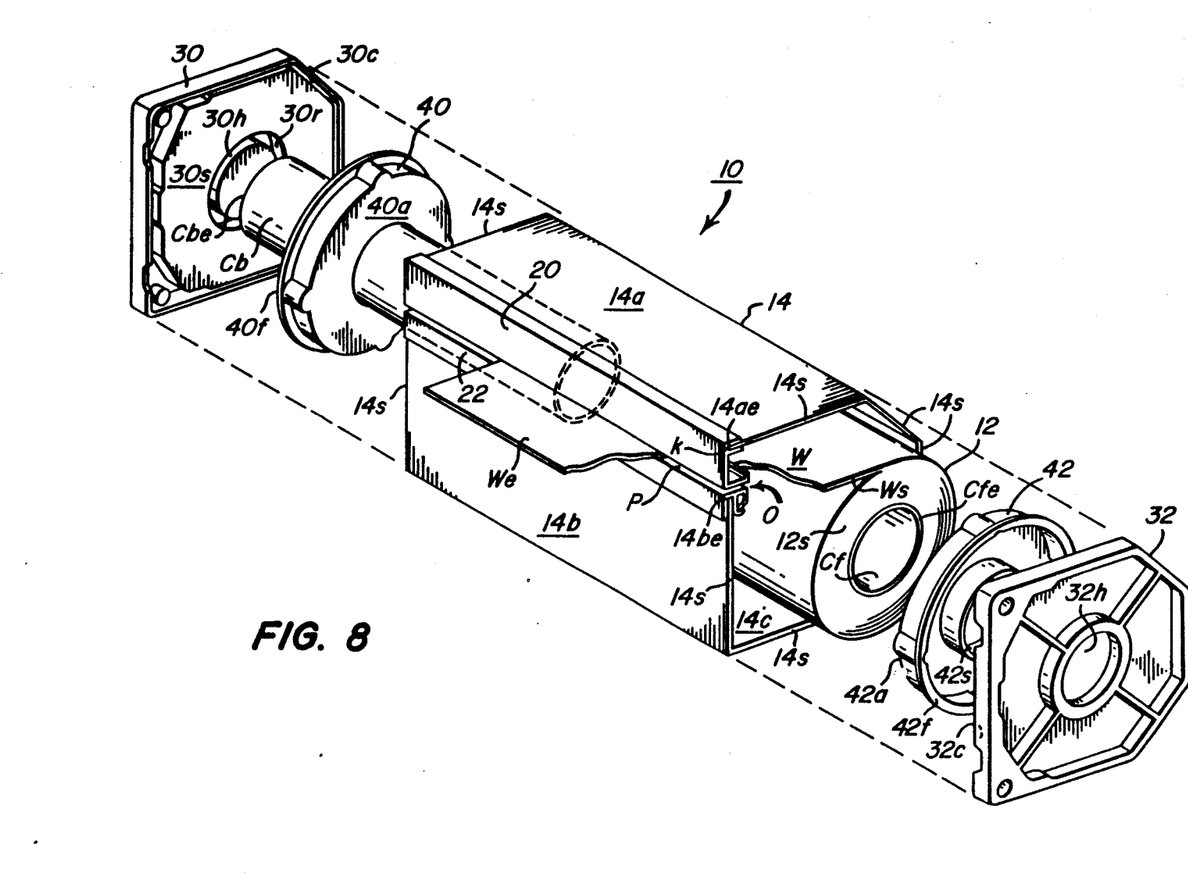
FIG. 8 is an exploded perspective view similar to FIG. 2, above, showing means provided in the cassette to position and support the web roll for rotation relative to the side caps, spacing members, and housing.

FIGS. 1, 2, and 8 illustrate, in perspective, a light-tight cassette 10 for enclosing and dispensing a roll 12 of photosensitive web material W. The cassette comprises a housing 14 which, as shown most clearly in FIG. 4, includes a plurality of housing wall portions 14a, 14b, 14c, 14d, 14e, and 14f having oppositely projecting side edges 14s. Housing wall portions 14a and 14b are substantially planar and extend perpendicularly to each other, and terminate in respective wall portion ends 14ae and 14be. It will be noted that ends 14ae and 14be are spaced from each other to define an opening O therebetween. It also will be noted that wall portions 14a and 14b lie in respective perpendicular planes that intersect at a locus which defines a corner K of the cassette. As shown, the wall portion ends 14ee and 14be, and the opening O therebetween, lie substantially in the plane of wall portion 14b.

Figure 3:
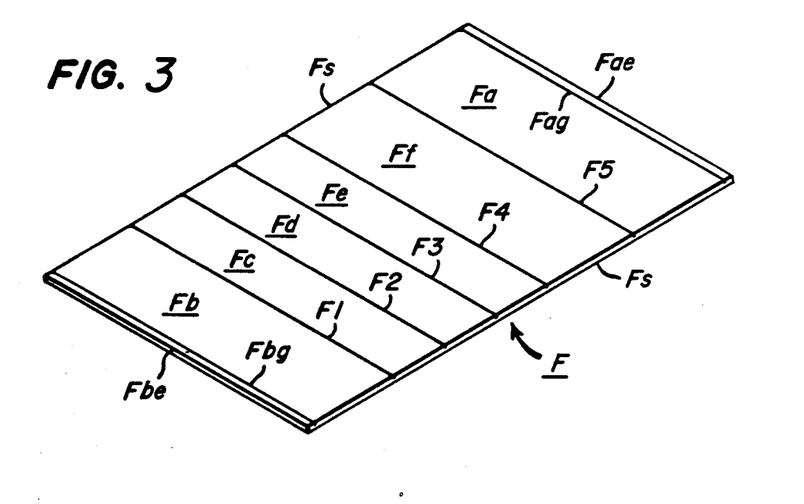
FIG. 3 is a perspective view of a flat fiberboard sheet that has been precut and creased to form, when folded, a cassette housing.
Figure 4:
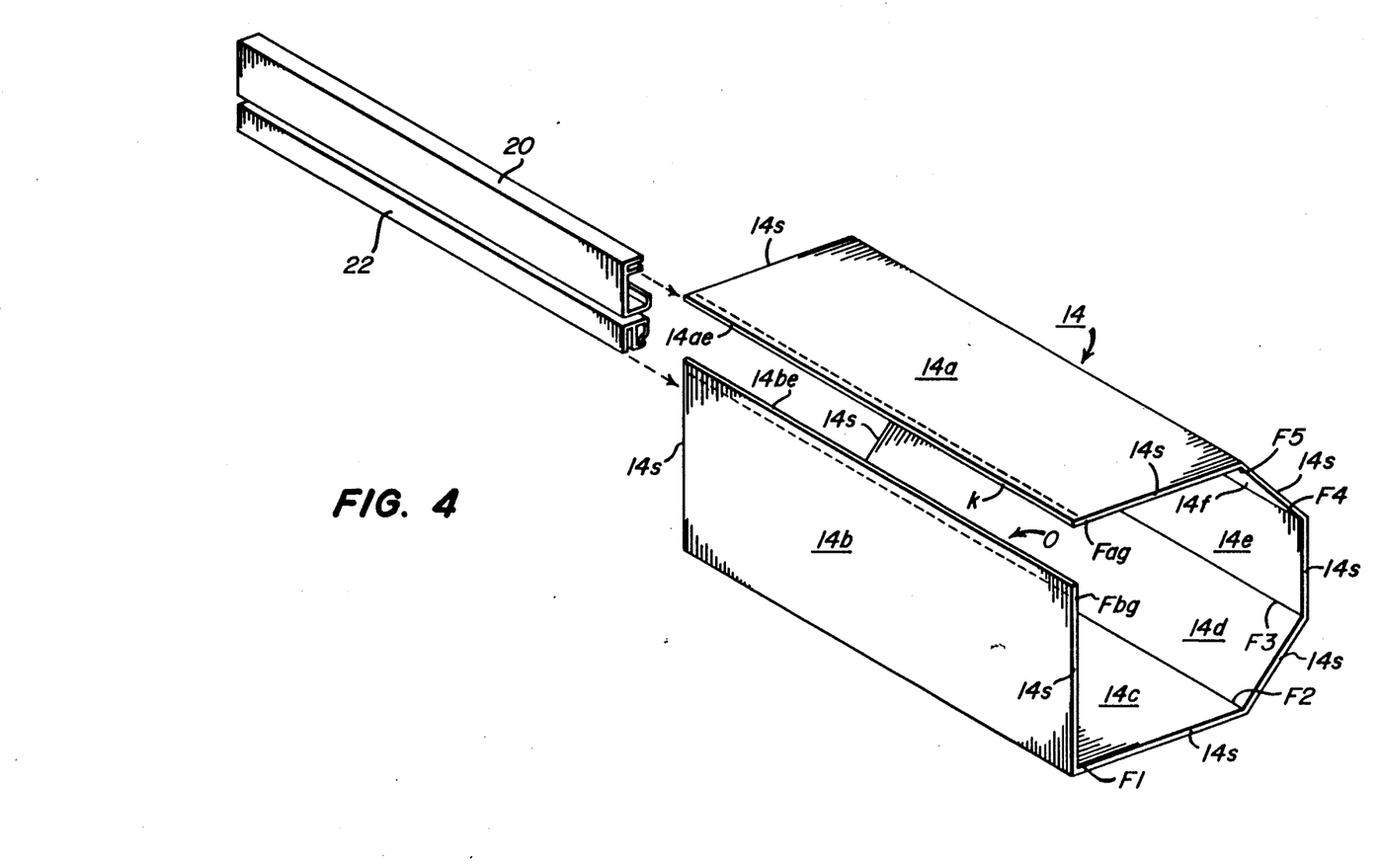
FIG. 4 is a perspective view of the fiberboard sheet of FIG. 3 after it has been folded and erected to form a cassatte housing, showing light-locking members about to be positioned on the housing.

Housing 14 is made from a flat sheet F of fiberboard, shown in FIG. 3, which has been precut to specified dimensions and creased to provide fold lines F1, F2, F3, F4, and F5, along which sheet F is folded and erected to form housing 14 as shown in FIG. 4. It will be noted that areas of sheet F designated Fa, Fb, Fc, Fd, Fe, and Ff correspond respectively to housing wall portions 14a, 14b, 14c, 14d, 14e, and 14f. Also, the sheet F lateral edges Fs corrrespond respectively to housing wall portion side edges 14s, while the sheet F longitudinal ends Fae and Fbe correspond respectively to housing wall portion ends 14ae and 14be.

Attached to ends 14ae and 14be, respectively, are a pair of light-locking members 20 and 22, depicted in FIG. 4 as they are about to be positioned thereon. When members 20 and 22 are fully positioned on ends 14ae and 14be as shown in FIGS. 2 and 8, member 20 extends across opening O toward member 22, to define a web exit passageway P therebetween. As illustrated more clearly in FIG. 5, member 20 includes an inwardly projecting cantilever portion 20c that is resiliently flexible toward and away from an opposing portion 22o of member 22. Preferably, both portions 20c and 22o have strips of light-locking material material m and n adhered thereto, respectively, to light-lock the exit passageway P.

Figure 5:
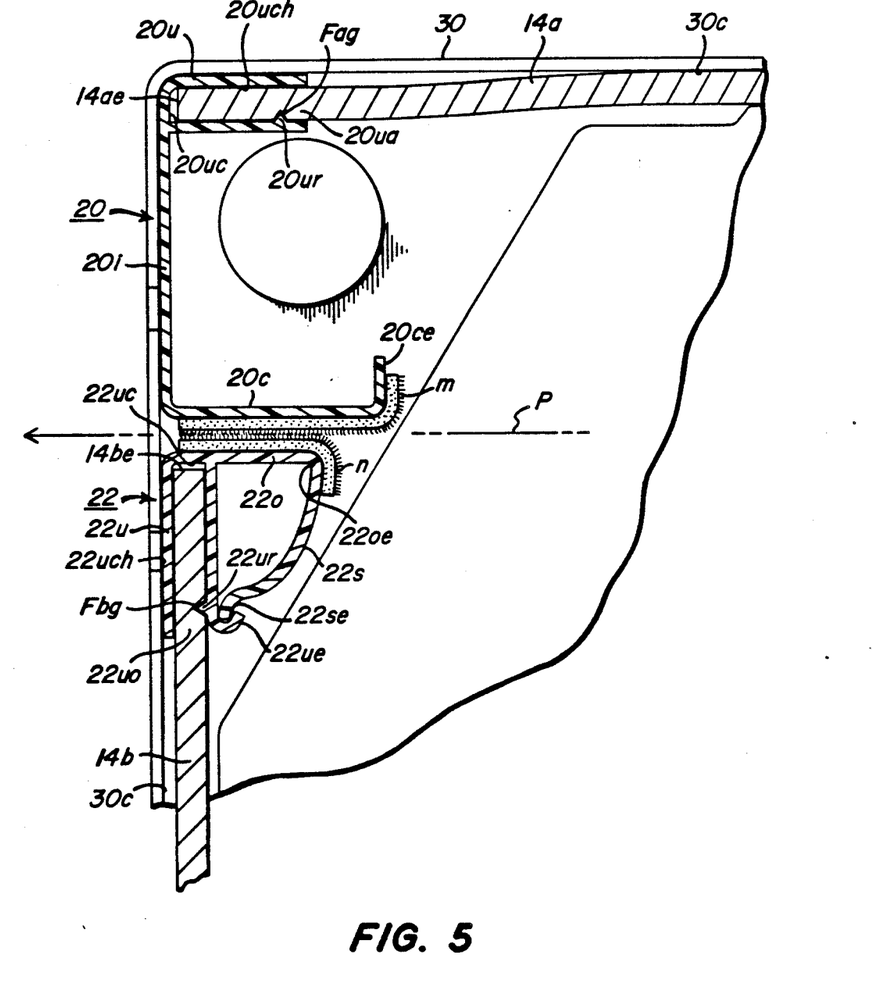
FIG. 5 is an enlarged sectional view of a corner portion of the cassette, taken along line 5—5 in FIG. 2, showing details of the light-locking members as fully positioned on the housing.
Figure 6:
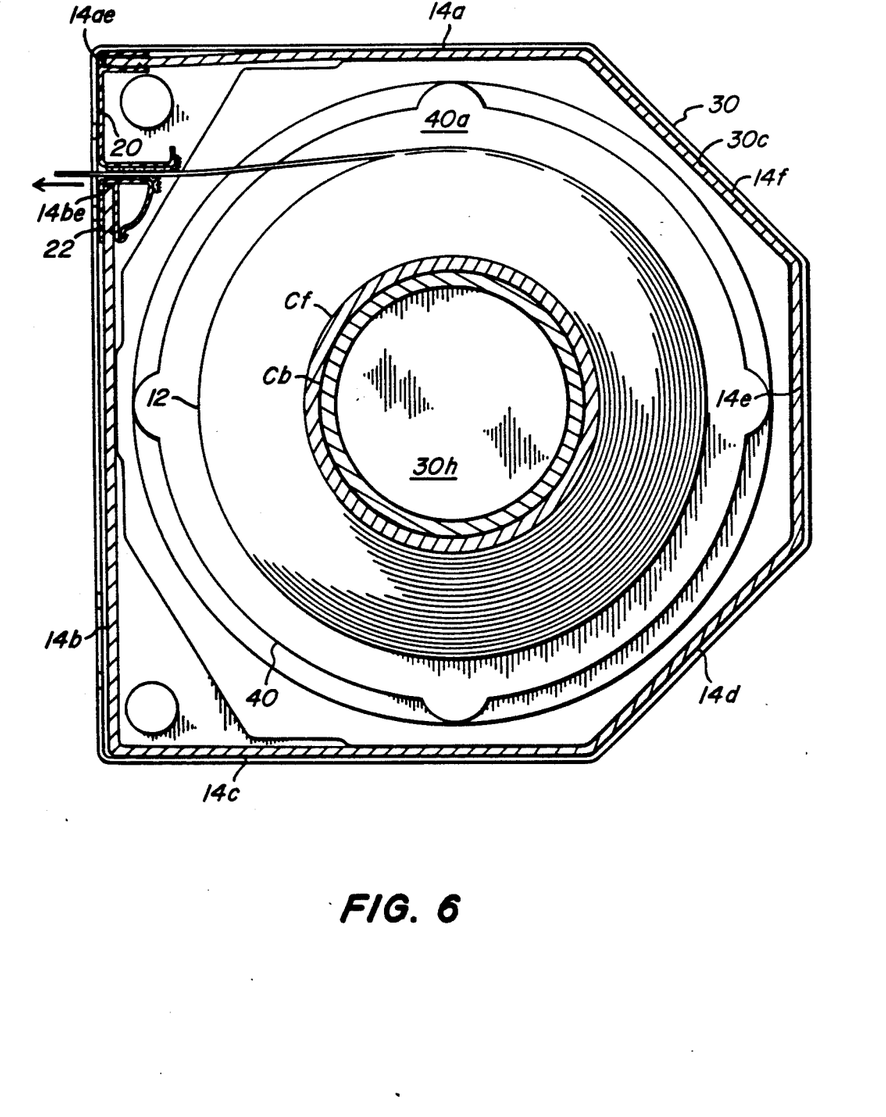
FIG. 6 is an enlarged transverse sectional view of the cassette, taken along line 6—6 in FIG. 2, showing positional relationships of one side cap, mating housing walls, the two light-locking members, one spacing member, a bearing core, and the web roll.

Light-locking member 20 includes a resiliently flexible U-shaped portion 20u having open and closed ends 20uo and 20uc, respectively, which define a channel 20uch configured to slidably receive and resiliently grip wall portion end 14ae, to thereby attach member 20 to that end. Similarly, light-locking member 22 includes a resiliently flexible U-shaped portion 22u having open and closed ends 22uo and 22uc, respectively, which define a channel 22uch for slidable receiving and resiliently gripping wall portion end 14be. The two U-shaped portions 20u and 22u have longitudinally extending ribs 20ur and 22ur that protrude respectively into channels 20uch and 22uch to help grip the wall portion ends 14ae and 14be received therein. As shown in FIGS. 3, 4, and 5, the fiberboard sheet F is creased to provide rib-receiving grooves Fag and Fbg to receive ribs 20ur and 22ur on the light-locking member U-shaped portions, to thereby help grip the wall portion ends received in channels 20uch and 22uch respectively.

Light-locking member 20 further includes a substantially planar intermediate portion 20i that extends perpendicularly from closed end 20uc of U-shaped portion 20u to the cantilever portion 20c, which is flexibley joined to intermediate portion 20i to project inwardly therefrom in a resiliently flexible manner. The opposing portion 22o of light-locking member 22 extends inwardly, and substantially perpendicularly, from closed end 22uc of U-shaped portion 22u to oppose the cantilever portion 20c of member 20. Cantilever portion 20c extends inwardly beyond opposing portion 22o to a free end 20ce that is distal from intermediate portion 20i, to help guide the web material W from roll 12 into the exit passageway. The cantilever portion 20c is resiliently biased toward opposing portion 22o so as to maintain the strips of light-locking material m and n in contact with web material W.

Light-locking member 22 further includes a supporting portion 22s which interconnects opposing portion 22o and U-shaped portion 22u. Supporting portion 22s is flexibly jointed to opposing portion 22o at a location 22oe on the opposing portion that is inwardly distant from closed end 22uc of U-shaped portion 22u; supporting portion 22s then projects angularly, and somewhat arcuately, therefrom into retaining engagement with U-shaped portion 22u at a location thereon which is perpendicularly distant from opposing portion 22o. Supporting portion 22s includes an end lip 22se distal from location 22oe; and U-shaped portion 22u has a retaining lip 22ue adjacent to the open end 22uo of U-shaped portion 22u. As shown in FIG. 5, end lip 22se is engaged with retaining lip 22ue to effect said retaining engagement and thereby provide necessary support for opposing portion 22o.

Figure 9:
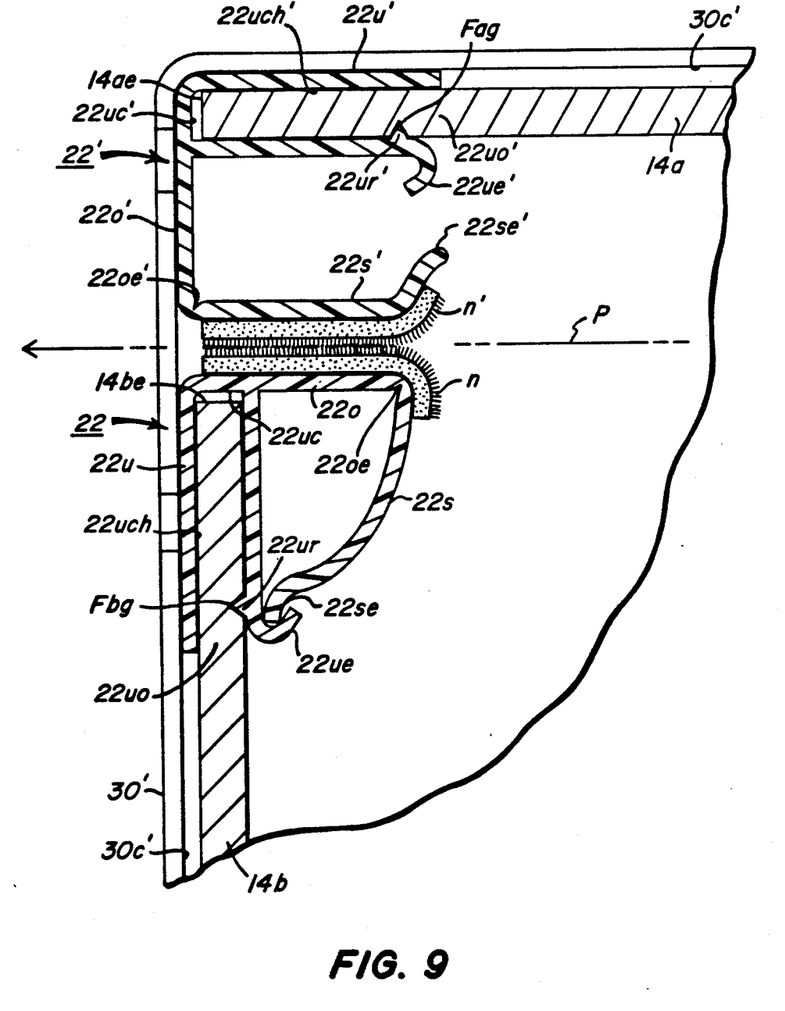
FIG. 9 is an enlarged sectional view similar to FIG. 5, above, but showing light-locking members as configured and positioned in accordance with an alternative embodiment of this invention.

An alternative embodiment of this invention is illustrated in FIG. 9, which presents a view similar to that seen in FIG. 5. It will be noted that the lower light-locking member 22 in FIG. 9 is configured and positioned on wall portion end 14be precisely as shown in FIG. 5 In the FIG. 9 embodiment, however, the upper light-locking member 20 of FIG. 5 is replaced by a different light-locking member 22'. With two exceptions, upper member 22' in FIG. 9 is identical to lower member 22. The first exception is that portions 22s' of member 22' projects substantially perpendicularly from intermediate portion 22o' so that its free end 22se' is not engaged with, but is spaced from, lip 22ue' on U-shaped portion 22v'. Portion 22s' is thus free t perform the same function that cantilever portion 20c in FIG. 5 performs. The second exception is that the light-locking material strip n' on upper member 22' is adhered to the underside of portion 22s' so as to face its counterpart n on lower member 22. Because of its flexible connection to intermediate portion 22o' at location 22oe', portion 22s' is resiliently flexible toward and away from opposing portion 22o, as is cantilever portion 20c in FIG. 5. An advantage of this embodiment over the FIG. 5 embodiment is that, as seen in FIG. 9, the same design of light-locking member is used for attachment to both wall portion ends.

Preferably, the light-locking members of both embodiments are made of extruded thermoplastic resin, polypropylene being especially suitable. A preferred construction for the light-locking material strips m, n, and n' is polyurethane foam with a nylon overlay and an adhesive underlay, for adhering the strips to the light-locking members. The combination of polyurethane foam and nylon overlay has proven beneficial in light-locking the exit passageway without marring sensitive surfaces of the exiting web.

Referring now to FIGS. 1, 2, and 8, the cassette of this invention further comprises a pair of side caps 30 and 32 having means for receiving, respectively, the oppositely projecting side edges 14s of the housing wall portions and means adapted to facilitate positioning of web roll 12 for relative rotation inside housing 14. The side cap means for receiving oppositely projecting side edges 14s include respective perimetric channels 30c and 32c configured to slidably receive those edges therein. The side cap means to facilitate positioning of the web roll for relative rotation inside the housing include centrally disposed, inwardly extending, hubs 30h and 32h on side caps 30 and 32 respectively. The web roll 12 is wound upon a roll forming core Cf having opposite ends Cfe that are substantially flush with respective opposite sides 12s of the roll. Rotatably supporting roll forming core Cf is a roll bearing core Cb having opposite end portions Cbe extending laterally beyond respective opposite ends Cfe and sides 12s. The two end portions Cbe are configured and dimensioned so as to be supportively receivable by the side cap hubs 30h and 32h respectively. Since roll forming core Cf is dimensioned to rotate freely upon roll bearing core Cb, there is no need for the roll bearing core to rotate relative to the hubs. Preferably, side caps 30 and 32 are made of molded thermoplastic resin, polystyrene being especially suitable. The web W illustrated in the drawings is phototypesetting paper, although the web could be any photosensitive paper or film material. The two cores Cf and Cb are each made of a suitable fiberboard material, both the inner surface of core Cf and the outer surface of core Cb being sufficiently hard and smooth to resist undue wearing during use.

Figure 7:
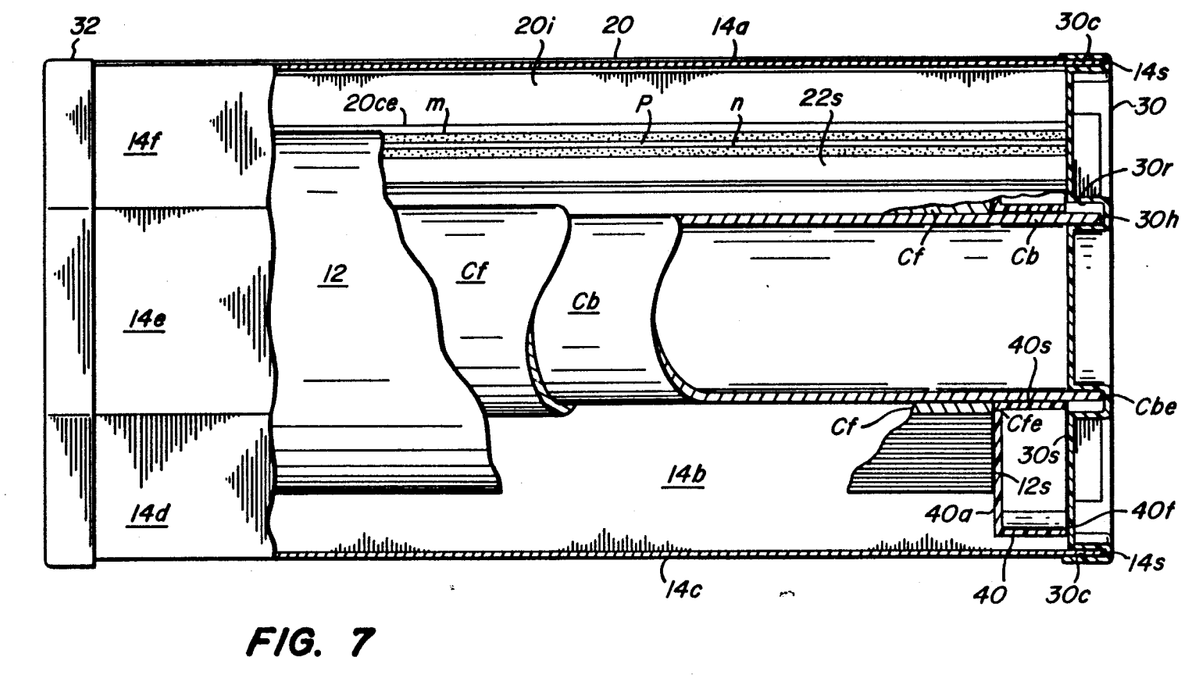
FIG. 7 is an enlarged longitudinal, partially sectional, view of the cassette, taken generally along line 7—7 in FIG. 2, showing positional relationships of the light-locking members, supporting housing walls, both side caps, one spacing member, the bearing core, and the web roll.

To help locate roll 12 medially within the cassette housing, a pair of annular spacers 40 and 42 are disposed respectively around the two opposite end portions Cbe of the roll bearing core, each between one of the caps 30 and 32 and the facing one of roll sides 12s as shown in FIGS. 2, 7, and 8. When the cassette is fully assembled, an annular outward-facing flange surface 40f on spacer 40 is disposed in adjacent facing relation to an inward-facing surface 30s on side cap 30, while an annular inward-facing surface 40a on spacer 40 is in similar facing relation to the adjacent side 12s of the web roll. With spacer 40 so positioned, the corresponding end portion of roll bearing core Cb extends freely through a sleeve portion 40s of spacer 40, into an annular recess 30r surrounding hub 30h on cap 30, and thus onto the hub itself. Similarly, spacer 42 is disposed so that its annular outward-facing flange surface 42f is in adjacent facing relation to an inward-facing surface (not shown) on side cap 32, while its annular inward-facing surface 42a is in similar facing relation to the adjacent side 12s of the web roll. Here too, the corresponding end portion of roll bearing core Cb extends freely through a sleeve portion 42s of spacer 42, into an annular recess (not shown) surrounding hub 32h on cap 32, and thus onto that hub. Preferably, spacers 40 and 42 are thermoformed froma suitable thermoplastic resin such as polystyrene.

The preferred method of making a cassette in accordance with this invention will now be described.

First, the fiberboard sheet F is cut to predetermined dimensions and creased to provide the fold lines and rib-receiving grooves discussed above. Sheet F is then folded along its fold lines and erected to form housing 14 as shown in FIG. 4.

The light-locking members preferably are extruded from a thermoplastic resin, such as polypropylene, and cut to their specified length. The aforementioned strips of light-locking material, cut to the same length, are then applied to the light-locking members. Before the lower light-locking member 22 is attached to housing wall portion end 14be, its supporting portion end lip 22se is snapped into engagement with retaining lip 22ue to provide needed support for opposing portion 22o. The two light-locking members are then attached to their respective housing wall portion ends as described above and illustrated in FIG. 4.

The roll 12 is provided with its web material W wound upon hollow roll forming core Cf, whose opposite ends Cfe are substantially flush with the web material lateral edges Ws forming roll sides 12s, thereby defining an overall roll width. The roll bearing core Cb is provided so as to fit slidably within core Cf, and so that its oppositely projecting end portions Cbe define a bearing core length which is greater than the overall roll width.

The side caps 30 and 32 preferably are molded from a thermoplastic resin such as polystyrene. With parts oriented as shown in FIGS. 1, 2, 4, and 8, side cap 30 is first attached to the open housing side defined by leftward-projecting wall edges 14s, by slidably inserting those edges into perimetric channel 30c. Roll bearing core Cb is then inserted through the open housing side defined by rightward-projecting wall edges 14s (herein-after the "right housing side") and fully into housing 14 so that the bearing core left end portion Cbe is received within annular recess 30r and around hub 30h. The web roll 12 is then inserted through the still-open right housing side, around bearing core right end portion Cbe, and thence slidably along the bearing core and into housing 14 until its left side 12s abuts against side cap surface 30s, so that both bearing core end portions Cbe extend laterally beyond the two roll forming core ends Cfe, and so that an end portion We of the web material leading from roll 12 projects outwardly through passageway P as illustrated. Side cap 32 is then attached to the open right housing side, by sliding the bearing core right end portion Cbe onto hub 32h and the rightward-projecting wall edges 14s into perimetric channel 32c, thereby closing the housing. Finally, the two side caps 30 and 32 are firmly secured to their respective housing sides by appropriately positioned staples S as shown in FIG. 1.

In the event that spacing members such as spacers 40 and 42 are needed to locate web roll 12 medially within the cassette, such spacers, preferably thermoformed from a thermoplastic resin such as polystyrene, are positioned inside the cassette housing as follows (with parts oriented as shown in FIGS. 2 and 8): (1) before inserting web roll 12, spacer 40 is inserted through the open right housing side, around and along the bearing core Cb, fully into the housing, and against side cap surface 30s; (2) web roll 12 is then inserted into the housing as described above but only to the extent that its left side 12s abuts against spacer surface 40a (instead of side cap surface 30s); and (3) after inserting web roll 12, spacer 42 is inserted through the still-open right housing side, around and partway along the bearing core Cb, into the housing, and against the right roll side 12s. When the cassette is fully assembled with spacers 40 and 42 so positioned, the web roll is thus located medially within the cassette housing, in laterally spaced relation to both side caps.

The present invention has now been described in detail with particular reference to embodiments illustrated herein. It will be understood, however, that variations and modifications can be effected within the spirit and scope of this invention.

We claim:

1. A method of making a light-tight cassette for enclosing and dispensing a roll of web material, said method comprising the steps of:

providing a fiberboard sheet of predetermined dimensions;

folding siad sheet to form a housing having a plurality of housing wall portions with oppositely projecting lateral edges defining first and second open sides of said housing, said plurality including first and second substantially planar wall portions that extend substantially perpendicularly to each other to respective first and second ends thereof which are disposed in spaced alignment to define an opening therebetween;

providing first and second extruded plastic light-locking members having means for respective attachment thereof to said first and second ends of said first and second wall portions, wherein said providing said light-locking members includes extruding each of said members so that its means for attachment comprises a resiliently flexible U-shaped portion with open and closed ends defining a channel configured to slidably receive and resiliently grip one of said wall portion ends, and wherein said providing said members further includes extruding said first member so that it has a substantially planar intermediate portion extending substantially perpendicularly from its U-shaped portion closed end to a cantilever portion thereof, and so that said cantilever portion is flexibly joined to said intermediate portion to project therefrom in a resiliently flexible manner;

attaching said first and second light-locking members to said first and second wall portion ends, respectively, so that said first member intermediate portion extends across said opening toward said second member to define web exit passageway therebetween, and so that said first member cantilever portion projects inwardly from said intermediate portion and is resiliently biased toward an opposing portion of said second member, at least one of said cantilever and opposing portions having light-locking material thereon for light-locking said passageway;

providing said roll of web material wound upon a hollow roll forming core having first and second opposite ends substantially flush with respective lateral edges of said web material wound thereon, said roll forming core ends defining an overall roll width therebetween;

providing a roll bearing core configured to fit slidably within said hollow roll forming core, said roll bearing core having first and second oppositely projecting end portions that define a bearing core length greater than said overall roll width;

providing first and second molded plastic side caps having means for respective attachment thereof to said first and second open housing sides and means for receiving, respectively, said first and second end portions of said roll bearing core;

attaching said first side cap to said first open housing side so that said first housing side is thereby closed;

inserting said roll bearing core through said second open housing side and fully into said housing so that said first bearing core end portion is received by said receiving means on said first side cap;

inserting said roll of web material through said second open housing side, around said roll bearing core, and slidably along said bearing core into said housing so that both of said bearing core end portions extend beyond side roll forming core ends, respectively, and so that an end portion of said web material leading from said roll projects outwardly through said passageway; and attaching said second side cap to said second open housing side so that said second bearing core end portion is received by said receiving means on said second side cap, and so that said second housing side is thereby closed.

2. A method as claimed in claim 1 wherein said step of providing said light-locking members further includes extruding said second member so that said opposing portion thereof extends substantially perpendicularly from its U-shaped portion closed end to a supporting portion thereof, and so that said supporting portion is flexibly joined to said opposing portion to project angularly therefrom into supporting engagement with said U-shaped portion thereof near its open end.

3. A method as claimed in claim 2 wherein said step of providing said light-locking members further includes extruding said members so that their U-shaped portions each have a rib protruding into said channel to help grip the one of said wall portion ends received therein.

4. A method as claimed in claim 3 wherein said step of providing said light-locking members further includes extruding said members from a thermoplastic resin including polypropylene.

5. A method as claimed in claim 3 wherein said step of providing said light-locking members further includes extruding said first member so that its cantilever portion extends inwardly to a free end thereof distal from said intermediate portion.

6. A method as claimed in claim 3 wherein said step of providing said light-locking members further includes applying said light-locking material to said at least one of said cantilever and opposing portions.

7. A method as claimed in claim 6 wherein said at least one of said cantilever and opposing portions comprises both of said cantilever and opposing portions.

8. A method as claimed in claim 6 wherein said step of attaching said first and second light-locking members includes slidably inserting said first and second wall portion ends into said channels defined by said first and second member U-shaped portions, respectively, so that said first member intermediate portion extends across said opening toward said second member U-shaped portion closed end.

9. A method as claimed in claim 8 wherein said step of providing said first and second side caps includes molding each of said caps so that its means for attachement comprises a perimetric channel configured to slidably receive said lateral edges defining one of said open housing sides.

10. A method as claimed in claim 9 wherein said step of providing said side caps further includes molding each of said caps so that its means for receiving comprises a centrally disposed hub configured to supportively receive one of said bearing core end portions.

11. A method as claimed in claim 10 wherein said step of providing said side caps further includes molding said caps from a thermoplastic resin including polystyrene.

12. A method as claimed in claim 10 wherein said step of attaching said first side cap includes slidably inserting said lateral edges defining said first open housing side into said first side cap perimetric channel.

13. A method as claimed in claim 12 wherein said step of inserting said roll bearing core includes positioning said first bearing core end portion on said first side cap hub.

14. A method as claimed in claim 13 wherein said step of inserting said roll includes placing said end portion of said web material between said first and second light-locking members.

15. A method as claimed in claim 14 wherein said step of attaching said second side cap includes positioning said second bearing core end portion on said second side cap hub and slidably inserting said lateral edges defining said second open housing side into said second side cap perimetric channel.

16. A method as claimed in claim 15 wherein said steps of attaching said first and second side caps further include securing said first and second caps to said first and second housing sides respectively.

17. A method as claimed in claim 16 further comprising the steps of:
providing first and second lateral spacers with a central opening therein configured to receive said roll bearing core freely therethrough;
before said step of inserting said roll, inserting said first spacer through said second open housing side, around and along said bearing core fully into said housing, and against said first side cap; and
after said step of inserting said roll, inserting said second spacer through said second open housing side, around said bearing core into said housing, and against said roll;
whereby said roll is disposed within said housing in laterally spaced relation to said side caps.

18. A method as claimed in claim 17 wherein said step of providing said lateral spacers includes forming said spacers from a thermoplastic resin.

* * * * *